United States Patent [19]

Rudden et al.

[11] Patent Number: 4,977,515

[45] Date of Patent: Dec. 11, 1990

[54] LOAD MANAGEMENT DEVICE AND METHOD OF USE

[76] Inventors: Frank G. Rudden, 52 Garfield Pl., East Northport, N.Y. 11731; Walter R. Sarno, 38 Frazer Dr., Greenlawn, N.Y. 11740

[21] Appl. No.: 237,967

[22] Filed: Aug. 29, 1988

[51] Int. Cl.$^5$ ............................................. G06F 15/20
[52] U.S. Cl. .................................. 364/492; 364/481; 364/483; 340/825.07
[58] Field of Search ............... 364/481, 483, 492, 143, 364/145; 340/825.07

[56] References Cited

U.S. PATENT DOCUMENTS

| | | | |
|---|---|---|---|
| 4,319,319 | 3/1982 | Wygant | 364/143 |
| 4,418,333 | 11/1983 | Schwarzbach et al. | 340/825.07 |
| 4,573,127 | 2/1986 | Korff | 364/493 |
| 4,771,185 | 9/1988 | Feron et al. | 364/492 |
| 4,819,180 | 4/1989 | Hedman et al. | 364/493 |
| 4,835,706 | 5/1989 | Asahi | 364/492 |
| 4,847,781 | 7/1989 | Brown, III et al. | 364/492 |

OTHER PUBLICATIONS

Penn; "A Low Cost Dedicated Microprocessor Forms the Heart of an Electronic Control System for Appliance Application"; I.E.E.E. 1977.

*Primary Examiner*—Parshotam S. Lall
*Assistant Examiner*—Ellis B. Ramirez
*Attorney, Agent, or Firm*—Brooks Haidt Haffner & Delahunty

[57] ABSTRACT

A plug in device, furnished by an electric power utility to a customer, is installed by the customer between a wall outlet and an appliance, particularly a room air conditioner. The device contains a microprocessor that is programmable and controllable by the utility to determine the ON-OFF cycling of the appliance. The microprocessor with the aid of sensors records date and time of each instance that a programmed OFF interval is overridden through a manual input, and each instance of disconnection of appliance from device after the first connection. Also, the device is arranged on command to record the power being drawn by the attached appliance, either on a one time basis or on a scheduled interval over a predetermined time span. A remote transmitter is also provided as a source of customer I.D. and control signals for utility control of selected devices in use. Certain embodiments have a component that is installed by qualified personal, hard wired into a control circuit, having a removable component removable either by service personnel or the customer for return to the utility to read out the contents of its memory as to its history of use. Similarly, the customer installed unit is returned or has a component returned for utility readout.

26 Claims, 8 Drawing Sheets

FIG. 2. FIG. 1.
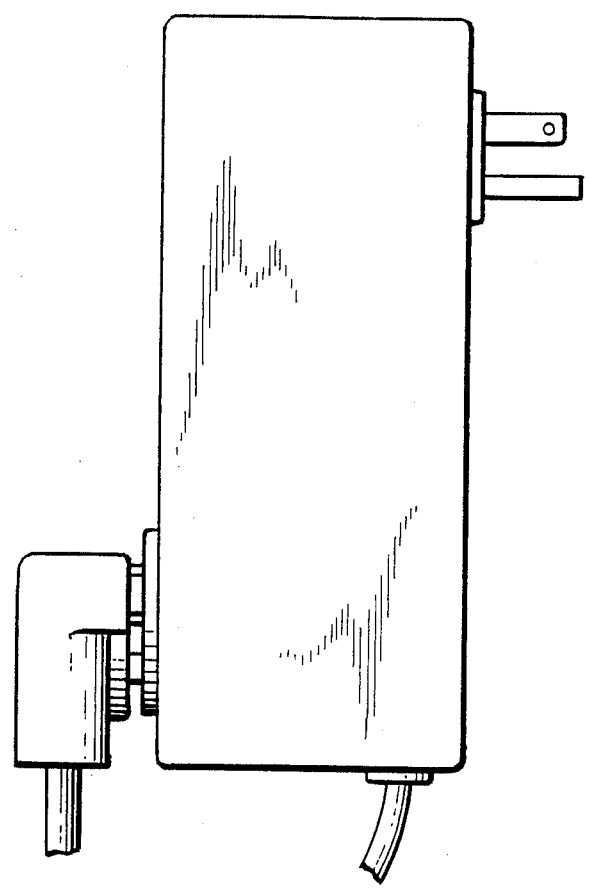
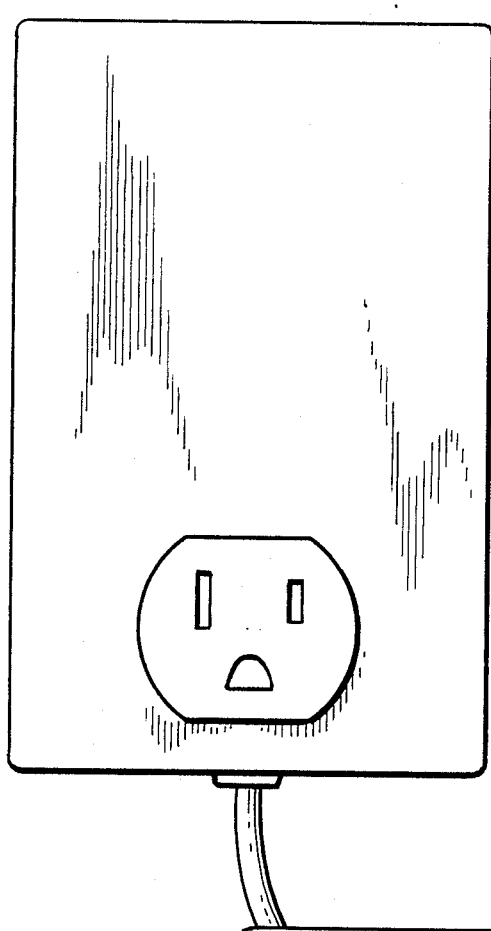
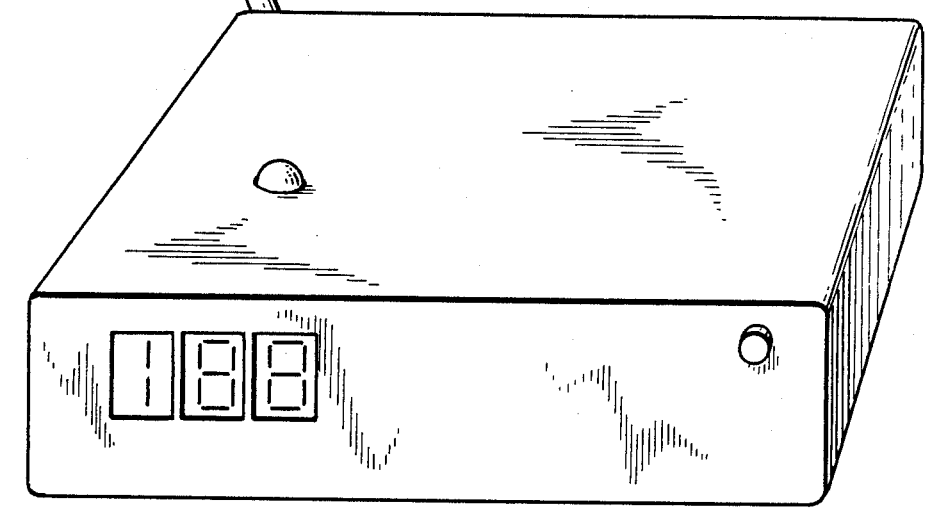

LOAD MANAGEMENT DEVICE AND METHOD OF USE

BACKGROUND OF THE INVENTION

The present invention relates to electric load management and, more particularly, to a load management system and method.

In an effort to obtain control over electric power demand, attention has become focused on room air conditioner units and other appliances that are heavy power users. For example, within one typical metropolitan area it was estimated that there were 2.7 million residential air conditioning units in use during the summer of 1986. Assuming that the average unit size is 9500 BTU, demand is approximately 1.05 KW. If control could be exercised over operation of just 10 percent of the total units in operation so as to shut down those units on command, demand could be reduced by approximately 270,000 units $\times$ 1.05 KW = 283.5 MW.

Because of the portability of room air conditioners, the fact that they are located on the premises of customers and can be plugged into almost any branch circuit, control of operation by the power utility is not a simple matter. In an endeavor to solve the problem a scheme was developed, as will be described herein, that relies on the cooperation of the customer.

To carry out the scheme a device was required that could be turned over to a customer for connection between the customer's air conditioner unit and the power outlet, which device could be programmed or controlled by the utility to shut down operation of the conditioner during certain times. Additionally, a financial incentive was believed to be necessary to induce life style and comfort level changes. The device had to be reliable and, if it was to be part of an incentive program, it had to be tamper proof.

As the program was conceived, the customer would be furnished with a device having at least a modular component part which, after a specified period of time, would be returned to the utility. If it could be confirmed that the customer installed the device and did not interfere with or alter its operation, the customer would be given appropriate financial compensation. Of course, it will be apparent that the basic concept is not limited to room air conditioner units but is applicable to other appliances and the like. For convenience, however, the invention will be described first with reference to room air conditioners.

SUMMARY OF THE INVENTION

It therefore is an object of the present invention to provide a device that can be furnished to a customer for customer installation in series with an electric appliance, which device can be controlled by an electric utility to provide primary ON-OFF power restraints.

Another object is to provide such device with the capability of having its programmed operation overridden by the customer while at the same time providing a recorded record of all instances in which the operation is overridden, which record is readable by the utility.

A further object is to provide a recorded record in the unit of any tampering with the device by the customer, which record is subsequently readable by the utility.

Yet another object is to provide a device of the foregoing general type that is capable of functioning as a load profile data recorder and, more particularly, is programmable from an external source to alter its data recording schedule.

In accordance with one aspect of the present invention there is provided a load management system comprising a control device having means for establishing its electrical connection in series with an electric powered appliance, between the appliance and a source of electric power therefor. The device includes a microprocessor. A switch is coupled to the microprocessor under its control for controlling circuit completion and interruption between the source of electric power and the appliance. The microprocessor includes a clock element for maintaining real time. A memory device is coupled to the microprocessor for storing data furnished by the microprocessor. A battery is coupled to at least the memory device for sustaining the memory capability of the memory device during interruption of power from the source of electric power. In addition, provision is made for receiving electrical control signals from an external source for initiating commencement of either an ON interval or an OFF interval of allowable operation of the appliance, the microprocessor having been pre-programmed to perform a time-clock function of determining the duration of the initiated interval. A sensor is also coupled to the microprocessor for sensing changes in the operation of the control device, the microprocessor being pre-programmed to record the date and time of each change in its operating mode including each instance of change in programmed operation of the control device. At least the memory device is housed in a removable plug-in structure whereby at least the memory device can be removed for independent downloading of any data stored therein.

In accordance with a further aspect of the present invention, there is provided a method of load management by an electric power utility of electric appliance demand comprising the steps of furnishing a customer of the utility with a plug-in device for installation between a preselected appliance and an electric power source on the premises of the customer. The device is arranged to selectively control the ON-OFF periods of the appliance operation to which it is connected. The device has means for sensing customer alteration of the utility intended operation. The device also has a memory for recording in the device its history of operation including each instance of customer alteration. The method further comprises instructing the device to interrupt power consumption by the appliance during selected times of anticipated peak power usage. Also the device is periodically retrieved from the customer and the contents of its memory is read to ascertain customer compliance with the utility schedule of reduced power usage by the pre-selected appliance.

In accordance with yet another aspect of the present invention, there is provided a device of the foregoing general type that includes a microprocessor with switch means coupled to the microprocessor under its control for controlling circuit completion and interruption between the source of electric power and the appliance. Clock means is associated with the microprocessor for maintaining real time, and memory means is associated with the microprocessor for storing data furnished by the microprocessor. Also, means are provided for receiving electrical control signals from an external source for programming the microprocessor to perform controlling and data recording functions and sensor means are coupled to the microprocessor for sensing at least the power drawn by the appliance, at least the memory means being housed in a removable plug-in structure whereby at least the memory means can be removed for down-loading of any data stored therein.

BRIEF DESCRIPTION OF THE DRAWINGS

The invention will be better understood after reading the following detailed description of the presently preferred embodiments thereof with reference to the appended drawings in which:

FIG. 1 is a side elevational view of the plug-in portion of a device constructed in accordance with the present invention;

FIG. 2 is a front elevational view of the part shown in FIG. 1 with the additional portion of the device shown in perspective;

The same reference numerals are used throughout the drawings to designate the same or similar parts.

DETAILED DESCRIPTION OF THE PRESENTLY PREFERRED EMBODIMENTS

Figure 3:
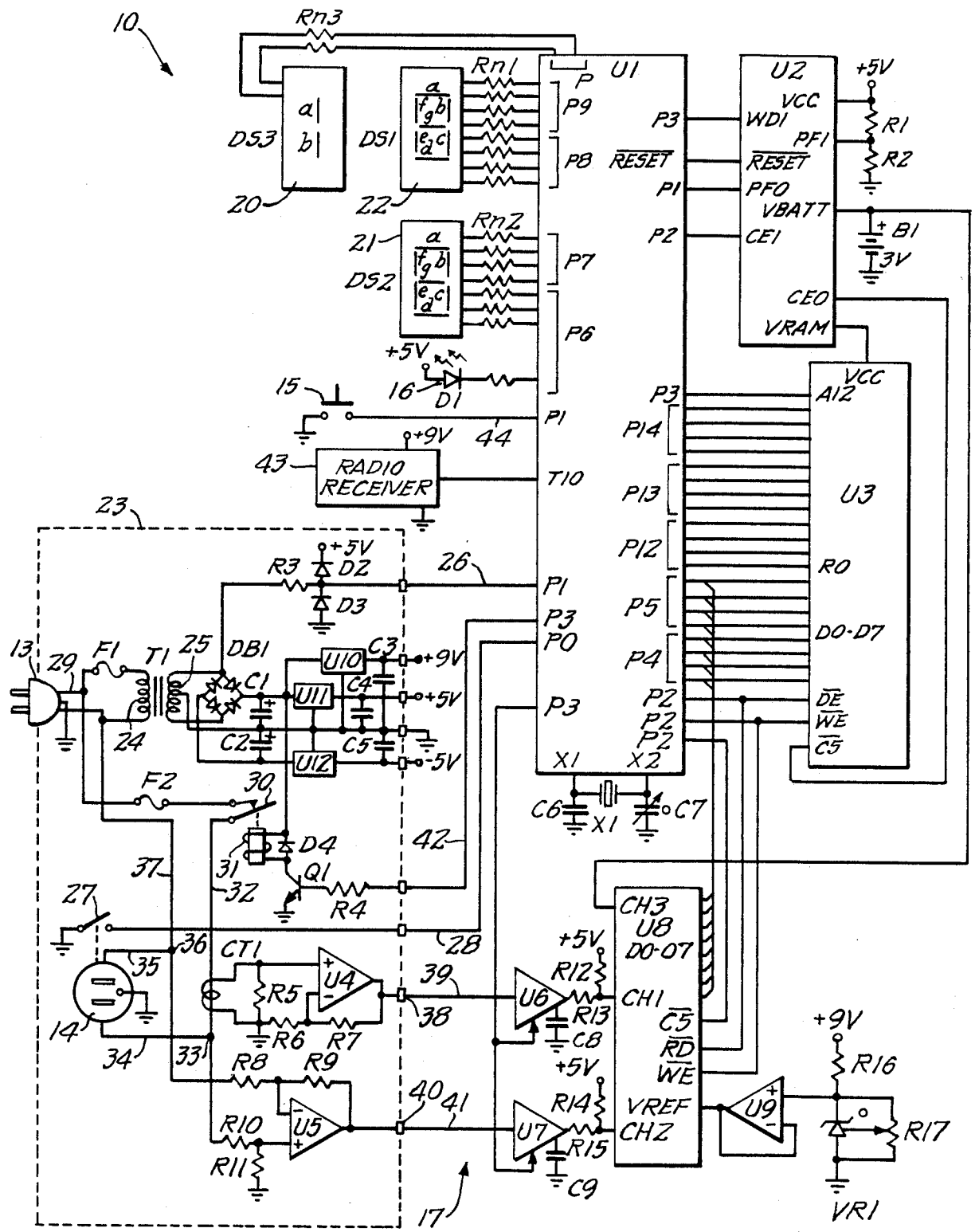
FIG. 3 is a schematic, diagram of the electric circuit incorporated in the device of FIGS. 1 and 2.

Referring to FIGS. 1 to 3, the device embodying the present invention is designated generally by the reference numeral 10. It consists of two housings, 11 and 12, a connector in the form of a 3-prong plug 13 for connection to an electric power outlet to receive line power, a receptacle 14 in the housing 11 for receiving the power plug of an appliance to be controlled, a manually operable button 15 for override input, and a signal lamp 16, e.g., a yellow lamp. While not shown specifically in the drawings, the housings 11 and 12 are preferably of the type that can be opened for access to the internal components and wiring, in which case the modules making up the device can be repaired should any of the internal components fail.

As shown in FIGS. 1 and 2, the housing 11 is connected to the housing 12, that is, the respective internal electronic components are interconnected, by a low voltage cable 17. In FIG. 1 an appliance plug 18 is shown plugged into the socket 14. In FIG. 2 it can be seen that the housing 12 contains a three-digit multi-segment display 19. In this particular embodiment the capacity of the three digits is to display numbers from 0 to 199 for which the hundreds position 20 is provided with a 2-segment display while the units and tens positions are provided with 7-segment displays 21 and 22.

Turning now to FIG. 3, the components contained within the broken line box 23 are housed within the housing 11 while the remaining components illustrated in FIG. 3 are contained in the separate housing 12. Referring further to FIG. 3, the line plug 13 is shown connected through a fuse F1 to the primary winding 24 of a transformer T1. The secondary winding 25 of transformer T1 is connected to a rectifier bridge DB1. Capacitors C1 and C2 filter ripple from the bridge output. The filtered dc is then regulated by the 3-terminal regulators U10, U11 and U12 to provide stable +9V dc, +5V dc and −5V dc power via appropriate cabling to the other components. A 60 Hz AC signal is obtained from secondary winding 25 which is connected through a resistor R3 clamped between ground and +5V by diodes D2 and D3. The output is applied over lead 26 in cable 17 to a microprocessor U1.

The socket 14 is provided with a mechanically actuatable switch 27 which serves to detect the presence of an inserted plug and provides a signal over lead 28 to an input port or terminal of microprocessor U1. Components C6, C7, and X1 constitute a crystal oscillator which serves as an accurate clock for the microprocessor U1. Common-anode 7-segment displays 21 and 22, 2-segment display 20, and a colored LED, 16 (preferably a yellow light), are driven directly by the microprocessor U1. Resistors RN1, RN2 and RN3 limit the LED drive currents to the display elements 20, 21 and 22.

A circuit can be traced from the line input point 29 at plug 13 through a fuse F2, the normally closed contacts 30 of a relay 31, and lead 32 to a junction 33 that is connected over lead 34 to one side of the socket 14. The other side of the socket 14 is connected over lead 35 to a junction 36 which is connected back over lead 37 to the opposite line side of plug 13.

Load current flowing through the leads 32 and 37 to the socket 14 is sensed by means of a current transformer CT1 whose output is amplified by an operational amplifier U4 and supplied to a terminal 38 that is connected over lead 39 to the input of a sample-and-hold integrated circuit U6 whose output is supplied via a resistance network consisting of R12 and R13 to one of the inputs of an analog-to-digital converter U8. Load voltage is measured differentially by a differential amplifier U5 connected to junction points 33 and 36 and having an output connected via terminal 40 and lead 41 to the input of another sample-and-hold integrated circuit U7 whose output feeds a second input of the analog-to-digital converter U8 through the resistance network consisting of resistors R14 and R15.

The relay 31 has its coil energized to disconnect the load that is plugged into socket 14 by current flowing through a Darlington transistor Q1 under control of the microprocessor U1 via the connecting lead 42. The diode D4 connected in parallel to the relay winding 31 is provided to suppress back EMF developed by the relay coil. The network consisting of a voltage regulator or Zener diode VR1 connected to the (+) input terminal of operational amplifier U9 provides a stable reference voltage for the voltage and current measurements supplied to the analog-to-digital converter U8. The analog-to-digital converter U8 converts the sampled signals from U6 and U7 into 8-bit digital data which is furnished to the microprocessor U1 where the data is manipulated mathematically to determine load power demand. The particular analog-to-digital converter employed as the device U8 has an internal multiplexer allowing it to measure up to eight independent analog channels. Only three channels are shown in the drawing, channel 3 being coupled to the positive terminal of battery B1 in order to obtain a low battery voltage signal. The battery B1 may be a 3V. lithium cell and is provided to furnish backup voltage through the power supply monitor integrated circuit U2 to a non-volatile memory integrated circuit U3. The circuit U3 may be a low-power CMOS static RAM integrated circuit.

The power supply monitor U2 is intended to reset the microprocessor U1 when line power is first applied to the system. It also monitors the +5V. power supply and, in the event of a power loss, issues an interrupt signal to the microprocessor and places the non-volatile memory U3 into its standby (low-power) mode and switches U3 on to battery power.

Finally, it can be seen from FIG. 3 that a radio receiver 43 is connected to an input of the microprocessor U1 while the manual input button 15 is connected over a lead 44 to another input of the microprocessor U1. The radio receiver 43 is preferably an FM receiver capable of receiving control signals externally generated and transmitted to the receiver from an external source, e.g., a remote central station or a local programming transmitter.

If it is desired to provide flexibility in programming the microprocessor U1, it is presently preferred to use a type NEC μPD 75P108; however, for mass production and dedicated usage, it may be preferable to use a type NEC μPD 75104CW device. In such case, the entire program can be incorporated in an internal 4K ROM by means of photolithographic masks used in manufacture.

In operation the microprocessor U1 can be initially programmed by the public or power utility to perform the desired control function. As presently contemplated, the microprocessor will be programmed to respond to a signal received from radio receiver 43 to initiate an OFF cycle of the connected appliance by energizing relay 31 to open contacts 30. The microprocessor will be pre-programmed to maintain the relay 31 energized for a preset interval of time. It is presently contemplated that the device will be programmed to provide an OFF period within the range of 30 to 180 minutes which time will be indicated on the display units 20, 21 and 22. That is, the display will indicate the time remaining before the power will be re-connected to the outlet 14. At any time, the customer can override the OFF condition by actuating manual input button 15 to provide a ground signal through lead 44 to the microprocessor. However, whenever this occurs the microprocessor will furnish signals to the memory device U3 to record the date and time at which an override input was received.

The microprocessor U1 can also be programmed to have a coded address which is either common to a group of control devices or unique to the specific device. If desired, a common address and a unique address can both be provided. In such case, the particular microprocessor will not respond to a signal received by radio receiver 43 unless such signal includes the address code for which the microprocessor has been pre-programmed.

When a customer desires to participate in the reward system for placing in operation a load management module in accordance with the present invention, such customer will be provided with the device as shown in FIG. 2. The portion 11 of the device will be plugged into an electrical outlet by the customer and the air conditioning unit will then be plugged into the outlet 14 as shown in FIG. 1. While the device is in use, the power utility can send interrogating signals and operating signals to the receiver 43 to accomplish any one of a series of operations. It is presently contemplated that a signal of a first type will instruct the microprocessor to record receipt of a message and the power being drawn by the load at that instant. Another signal will instruct the microprocessor to record receipt of a message, the power being drawn by the load, and to repeat the measurements at a predetermined time interval over a predetermined period of time. That is, for example, the device might record the power demand at five-minute intervals over a two-hour period thereby providing a load profile record. A third option is for the microprocessor to record receipt of the message, power demand of the load, and to then disconnect the load for a preset interval. The time remaining will be constantly displayed by the indicator so that the customer may be informed as to when normal operation will be restored. Finally, it is contemplated that the microprocessor be instructed to record a message as a means of verifying that the control device was in circuit at the time that the control signal was transmitted to the receiver 43.

The flexibility in programming capability of the microprocessor U1 is such that the device can be used for load profile data recording with the ability to have its data recording schedule altered at any time by a remote signal transmission.

In one mode of operation, the device would remain in the customer's possession over the summer months and the customer at the end of the summer would remove the device and return it to the utility. The utility would then read out the data recorded in the memory unit U3 and determine whether or not the customer had complied with the intent and is entitled to a suitable reward or compensation.

Another feature contemplated is that the microprocessor U1 will be pre-programmed so that upon receipt of a particular coded signal it will energize the signal lamp 16 so as to alert the customer that the customer might expect the power to be turned off sometime later that day. Another mode of operation is to signal the customer by blinking the numerical display elements 20, 21 and 22 in order to indicate some malfunction in the control device.

It should now be apparent that there has been described a device wherein a plug-in connector is provided for connection to an electrical power outlet to receive line power, a receptacle has been provided for receiving the power plug of the appliance, and a switch has been provided in circuit between the connector and the receptable. These components are located within the housing 11 in the embodiment just described.

Figure 4:
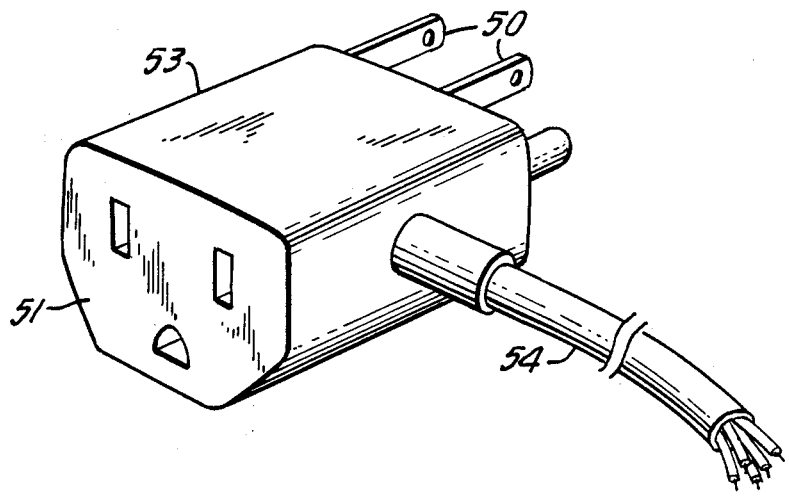
FIG. 4 is a fragmentary perspective view of a feed through plug assembly forming a part of another embodiment of the invention.
Figure 5:
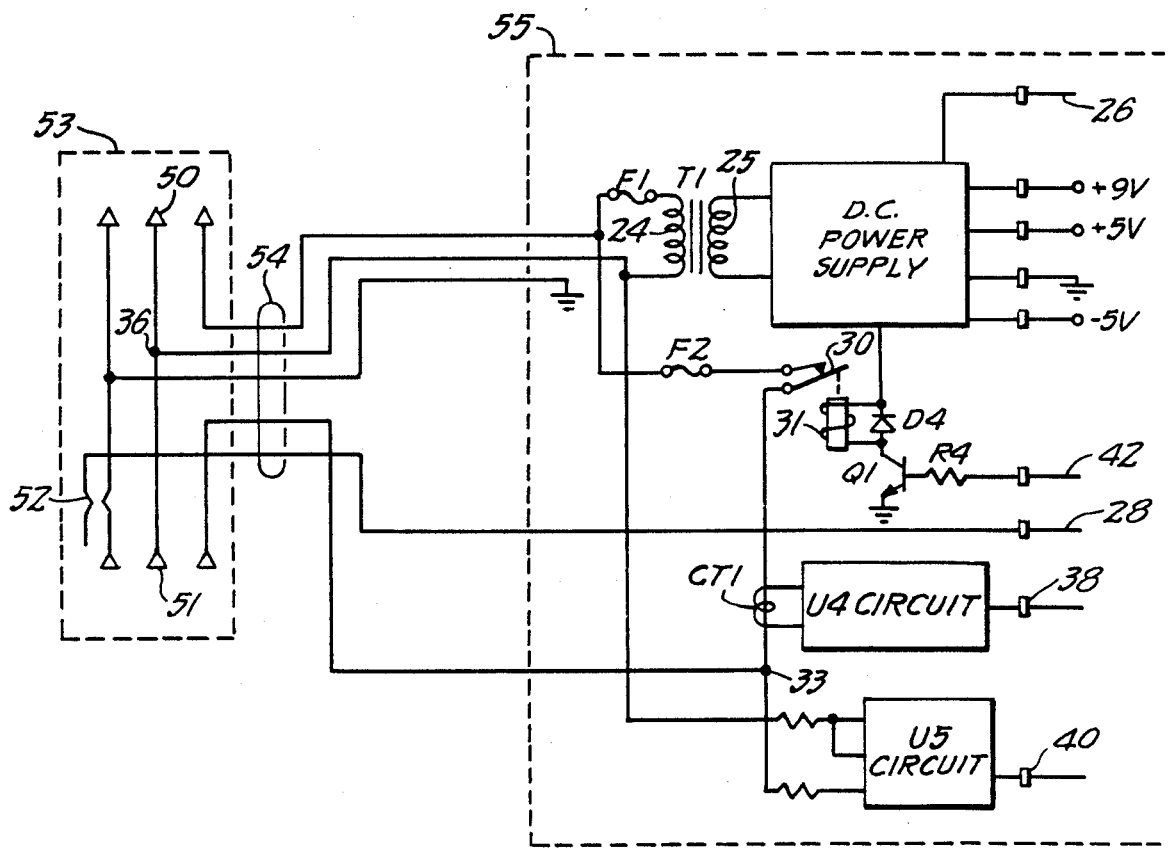
FIG. 5 is a fragmentary schematic diagram showing the modification of the circuit of FIG. 3 when using the plug assembly; of FIG. 4.

Turning now to FIGS. 4 and 5, there is shown a modification of the invention wherein the plug-in connector 50, receptacle 51, and appliance-plug removal sensor 52 (see FIG. 5) are disposed in a compact feed-through plug assembly 53 with a cable 54, rated for line voltage, connecting the plug assembly 53 to a component housing 55 containing all of the remaining components of the device. The circuit of FIG. 5 may be compared to the circuit of FIG. 3 wherein the components within the broken line box 23 of FIG. 3 are replaced or shown in simplified form in FIG. 5. Operation of the embodiment of FIGS. 4 and 5 is essentially the same as that previously described with reference to FIGS. 1 to 3.

The two embodiments described so far are of the type that can be readily installed by a customer since it merely requires plugging the device into a wall outlet and plugging the particular appliance into the device. This is well suited for supervising the load management of room air conditioning devices. However, the device is not suited to the management of load drawn by larger devices such as central air conditioning units, electric water heaters, electric ranges and the like. The latter units are hard wired and require an electrician to install this type of control circuit between the power line and the utilizing appliance. For this purpose a further embodiment of the invention will now be described with reference to FIG. 6 to which attention should now be directed.

Figure 6:
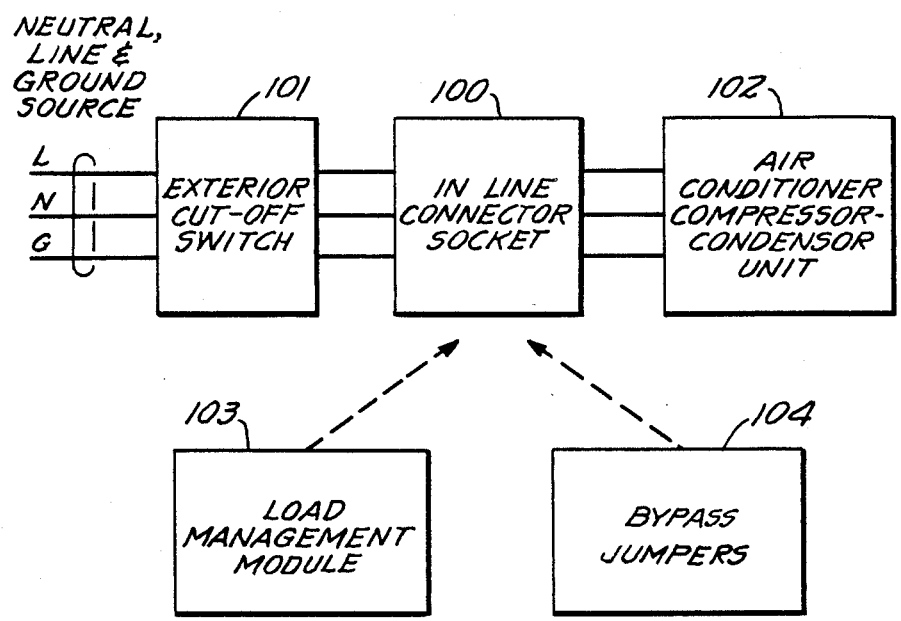
FIG. 6 is a block diagram illustrating a further embodiment of the invention.

As shown in FIG. 6, an in-line connector socket 100 can be connected by a qualified electrician in series between, for example, the exterior cut-off switch 101 and the air conditioner compressor condenser unit 102. The line connector socket may have any suitable configuration into which the load management module 103 or by-pass jumpers 104 can be plug connected. One embodiment presently contemplated has a housing similar to that presently used on outdoor electric meters and contains all of the components shown in FIG. 3. As seen in FIG. 3 the three leads connected to the plug 13 would, in FIG. 6, be connected to the line side of the in-line connector socket 100 so as to receive line power from the exterior cut-off switch 101. The three leads connected to the socket 14 in FIG. 3, as well as the ground connection to the disconnect or sensor switch 27 would be connected to the load side of in-line connector socket 100. Of course, the relay contacts 30 would be of heavier duty to handle the usual 208–240 volt supply that is normally used to operate central air conditioning units rather than the lower nominal 120 volt supply found within buildings and which is generally used to power room air conditioners.

An arrangement of the type illustrated in FIG. 6 requires installation and removal of the load management module 103 from its socket 100. The system operates essentially in the same manner as the system described with reference to FIGS. 1 to 3. The bypass jumpers 104 are employed to replace the load management module when it must be removed either for repair or at the request of the customer. The bypass jumpers will enable the customer to use the central air conditioning unit during the period when the load management module is absent.

With the embodiment of FIG. 6, although not illustrated, the load management module 103 can be provided with a memory storage unit in the form of a removable cartridge. In such case, removal of the memory cartridge will be arranged to automatically place the load management module in a continuous power ON condition which will be restored to its normal control function upon replacement of the memory cartridge. When a removable cartridge is used, the customer will merely remove the memory cartridge and return it to the utility for reading the contents of its memory.

Figure 7:
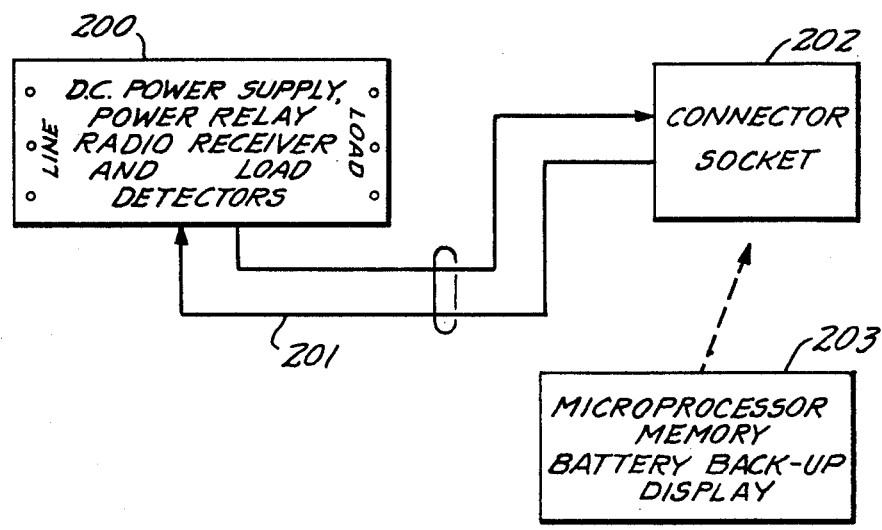
FIG. 7 is a block diagram showing as a modification of the arrangement of FIG. 6, yet another embodiment of the invention.

A further embodiment is shown in FIG. 7 wherein the dc power supply, power relay, radio receiver and load detectors are located in a module 200 that is arranged for hard wiring in place of the in-line connector socket 100 of FIG. 6. A low voltage cable 201 connects the module 200 to a connector socket 202. The connector socket 202 may be located either externally or internally of the particular building depending upon the desire of either the utility or of the customer. All the remaining electronics, including the microprocessor, memory, battery back-up and display, are in a plug-in unit 203 that can be installed and removed from the connector socket 202 by the customer. If the unit has a removable memory cartridge, then only the memory cartridge will have to be removed and returned to the utility.

In the embodiment of FIGS. 1–3, the circuit components are divided between two housings, 11 and 12. As an alternative, all of the components can be incorporated in a single housing as shown schematically in FIG. 8 to which attention should now be directed. It will be observed that the embodiment of FIG. 8 includes a number of features not found in the embodiment of FIGS. 1 to 7 which features can be included in the embodiments of FIGS. 1 to 7, if desired.

Figure 8:
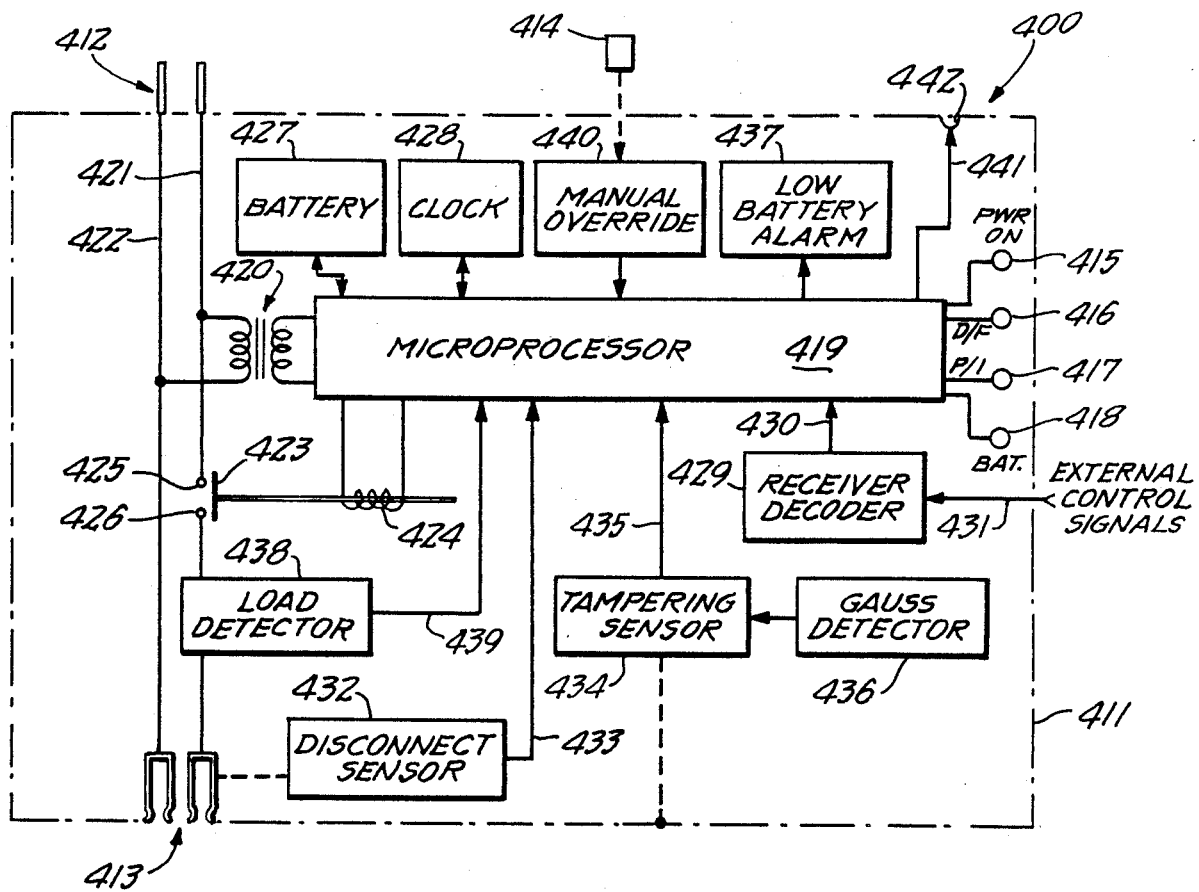
FIG. 8 is a block diagram showing another embodiment of the invention.
Figure 10:
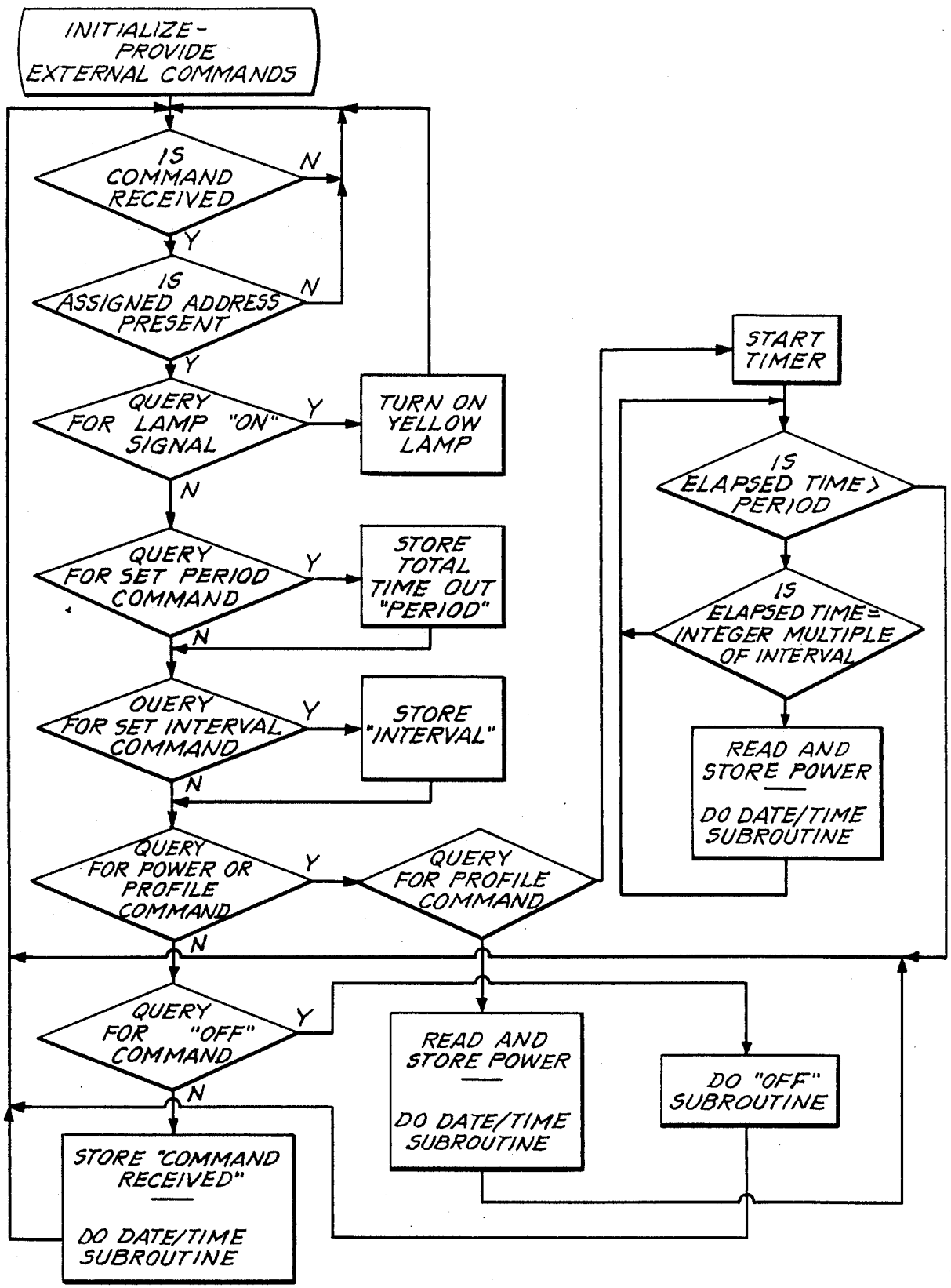
FIGS. 10, 11 and 12 contain a flow chart illustrating the operation of the load management module embodying the present invention.
Figure 11:
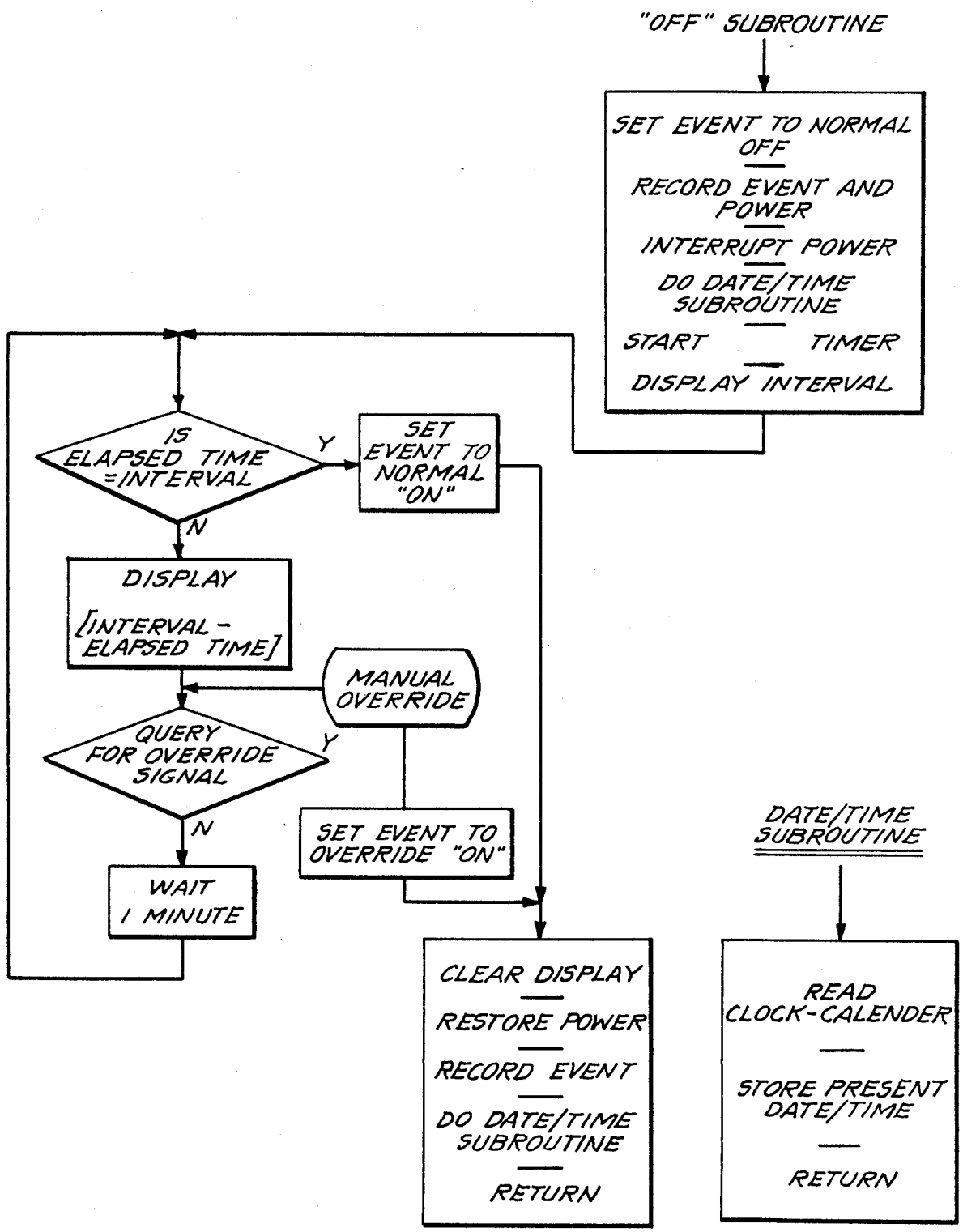
Figure 12:
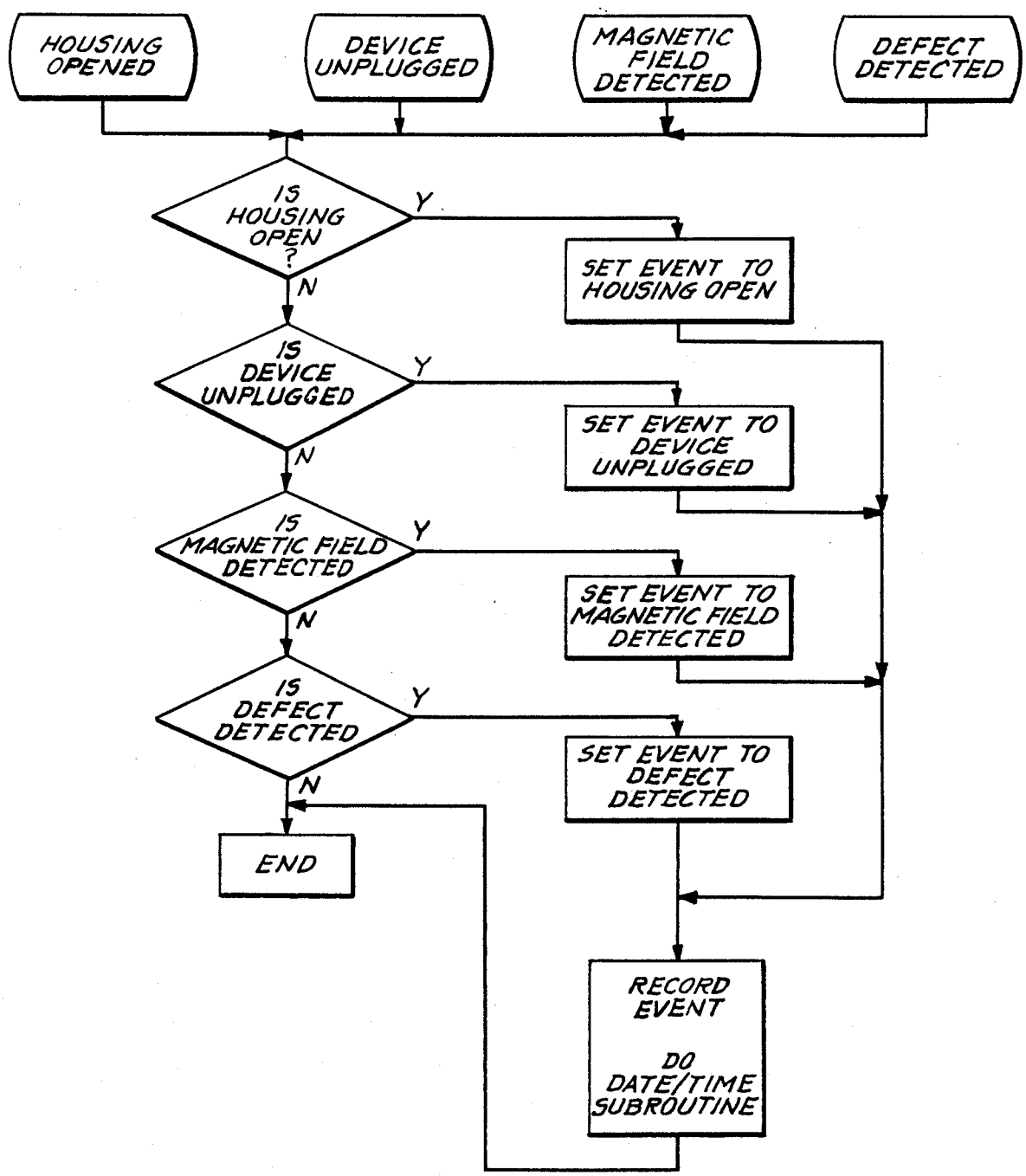

The housing for the components may be similar to housing 11 in FIG. 1 with an external plug and receptacle. In FIG. 8, the device is designated generally by the reference numeral 400. It consists of a housing 411, a connector in the form of a plug 412 for connection to an electric power outlet to receive line power, a receptacle 413 for receiving the power plug of the appliance to be controlled, a manually operable button 414 for override input, and a series of signal lamps 415, 416, 417 and 418.

While not shown in the drawings, the housing 411 is preferably of the type that can be opened for access to the internal components and wiring, in which case the device can be repaired should any of the internal components fail.

Within housing 411, there is a microprocessor 419 coupled through a transformer 420 and lines 421 and 422 to the connector 412 for receiving operating line power therefrom when plug 412 is plugged into a power receptacle. A line switch 423 is coupled via solenoid 424 to the microprocessor 419 responsive to signals from microprocessor 419 for controlling circuit completion across contact terminals 425 and 426 between the connector 412 and receptacle 413.

A clock component 428 is coupled thereto for providing microprocessor 419 with real time input. A battery 427, rechargeable if so desired, is coupled to the microprocessor 419 for operating at least the clock component 428 and maintaining the memory sections of the microprocessor 419 during interruption of line power to the power outlet supplying plug 412. A receiver decoder 429 has an output 430 connected to microprocessor 419, and an input 431 for receiving external control signals. Input 431 may be in the form of an antenna for receiving radio waves or any suitable carrier based signal. Signals applied through receiver decoder 429 to the microprocessor 419 are used to program the microprocessor to perform a time clock like function of controlling the ON-OFF operation of the appliance in accordance with ON-OFF cycle settings over a predetermined time interval.

A series of sensor means are coupled to microprocessor 419 for sensing interference with programmed operation of the device 400. Thus, there is a disconnect sensor 432 connected to the receptacle 413 for detecting whenever an appliance plug is removed from receptacle 413. An output from sensor 432 is coupled over line 433 to microprocessor 419. A tampering sensor 434 has an output coupled over line 435 to the microprocessor. As indicated schematically, the sensor 434 detects whenever the housing 411 is opened. In addition, a gauss detector 436 feeds a signal to sensor 434 whenever a magnetic field is applied to the device of a nature to adversely affect memory circuits within microprocessor 419. The memory circuits are programmed to record the date and time of each change in the operating mode of the microprocessor including the cycle settings entered through the receiver decoder 429. Thus, gauss detector 436 will reveal when the device has been subjected to memory erasing activity.

A low battery alarm 437 is connected to microprocessor 419 for alerting the customer to that fact. The device is then returned to the utility company for replacement or recharging of the battery.

One further sensor is a load detector 438 connected in series with the receptacle 413 and, therefore, in series with the load. Output from load detector 438 is fed over line 439 to microprocessor 419. By programming the microprocessor, a recorded record can be kept of load demand of the attached load. The record should include date and time data.

As shown in FIG. 8, the manually operable input button 414 is coupled to a manual override circuit 440, which, in turn, is connected to microprocessor 419. Thus, the customer can cause switch 423 to close by depressing button 414 even though the programming of the microprocessor calls for an OFF period. However, the microprocessor is preprogrammed to store in its memory each instance of user override including date and time.

The four signal lamps 415, 416, 417 and 418 are provided to alert the user to various conditions. Lamp 415 signals that power is reaching the module from plug 412. Lamp 416 signals device failure (D/F), i.e., any failure or malfunction of the module, to alert a customer to return the module to the utility for an exchange. Lamp 417 signals that there has occurred a program infraction (P/I), while lamp 418 provides a visual indication of low battery.

Finally, the microprocessor 419 is connected by line 441 to a terminal 442, for example a jack, whereby the information stored in the memory section of the microprocessor can be read out by the utility when the customer returns the device. The mode of operation of the embodiment of FIG. 8 should now be readily apparent.

Figure 9:
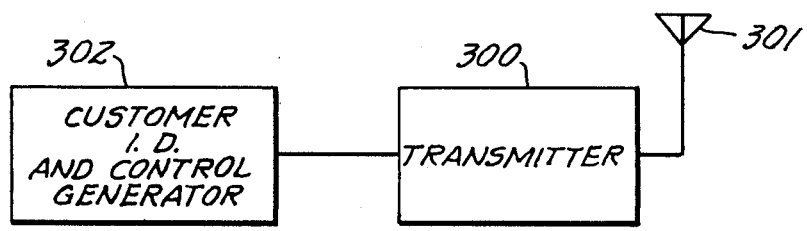
FIG. 9 is a block diagram of a transmitter for communicating with the device of FIGS. 1 to 7.

Turning now to FIG. 9, there is shown an example of a remote transmitter control circuit for sending control signals to the devices 10, 103, 200 or 400. As shown, a radio transmitter 300 is provided with an antenna 301 and has its signal modulated by a customer I.D. and control generator 302. If groups of devices or modules are to be controlled simultaneously, the customer I.D. (identification) can be omitted or a common address signal can be used as discussed previously. For maximum control each radio receiver, e.g., receiver 43 in FIG. 3, can be assigned a unique digital code I.D. and will receive and respond only to signals including such corresponding code signals.

Having described the present invention in terms of the presently preferred embodiments thereof, it should be apparent that various changes in construction and operation can be introduced as will occur to those skilled in the subject art without departing from the true spirit of the invention as defined in the appended claims.

What is claimed is:

1. A load management system comprising a control device having means for establishing its electrical connection in series with an electric powered appliance, between said appliance and a source of electric power therefor, said device including a microprocessor, switch means coupled to said microprocessor under its control for controlling circuit completion and interruption between said source of electric power and said appliance, said microprocessor including clock means for maintaining real time, memory means coupled to said microprocessor for storing data furnished by said microprocessor, a battery coupled to at least said memory means for sustaining the memory capability of said memory means during interruption of power from said source of electric power, means for receiving electrical control signals from an external source for initiating commencement of either an ON interval or an OFF interval of allowable operation of said appliance, said microprocessor having been pre-programmed to perform a time-clock function of determining the duration of any such initiated interval, sensor means coupled to said microprocessor for sensing changes in the operation of said device, said microprocessor being pre-programmed to record the date and time of each change in its operating mode including each instance of change in programmed operation of said device, at least said memory means being housed in a removable plug-in structure whereby at least said memory means can be removed for independent down-loading of any data stored therein.

2. A load management system according to claim 1, wherein said means for establishing the electrical connection of said control device in series with an electric powered appliance comprises plug receiving socket means for wired installation between said appliance and said source of electric power therefor with at least the hot line to said appliance being interrupted by said socket means at a pair of plug receiving terminals n said socket means, and the remaining components of said control device are disposed within a closed housing having plug-in connector means for insertion in said socket means, said plug-in connector means having a first section for connection to line side terminals in said socket means, and a second section for connection to load side terminals in said socket means, and means connecting said switch means in circuit between said first and second section of said connector means.

3. A load management system according to claim 1, wherein said sensor means comprises means for detecting the voltage applied to said appliance and for detecting the current flowing between said source of electric power and said appliance whenever said switch means completes the circuit between said source of power and said appliance.

4. A load management system according to claim 1, further comprising a remote transmitter for transmitting carrier based control signals to said means for receiving electrical control signals from an external source, and means for furnishing said transmitter with control signals for instructing said microprocessor to commence an OFF period of operation.

5. A load management system according to claim 1, wherein said control device comprises plug-in connector means for connection to an electric power outlet to receive line power, a receptacle for receiving the power plug of said appliance, and means connecting said switch means in circuit between said connector means and said receptacle.

6. A load management system according to claim 5, wherein said sensor means comprises means for detecting whenever an appliance plug is inserted in or removed from said receptacle, said microprocessor being pre-programmed to record the date and time of each change in status of said sensor detecting means.

7. A load management system according to claim 5, wherein said plug-in connector means, receptacle and appliance-plug removal sensor means are disposed in a compact feed-through plug assembly, with a line voltage cable connecting said plug assembly to a component housing for all of the remaining components of said device.

8. A load management system according to claim 5, wherein said plug-in connector means, receptacle, switch means and sensor means are disposed in a first housing for installation between said appliance and an outlet for said source of electric power, and the remaining components of said control device are disposed within a second housing wire-connected to the components in said first housing.

9. A load management system according to claim 8, wherein a low voltage dc power supply is disposed in said first housing for deriving energizing power from said connector means and for supplying low voltage dc over said wire connection to the components in said second housing.

10. A load management system according to claim 1, wherein said control device comprises manually operable means for switching said device from an OFF to an ON condition.

11. A load management system according to claim 10, wherein said control device comprises plug-in connector means for connection to an electric power outlet to receive line power, a receptacle for receiving the power plug of said appliance, and means connecting said switch means in circuit between said connector means and said receptacle.

12. A load management system according to claim 11, wherein said sensor means comprises means for detecting whenever an appliance plug is inserted in or removed from said receptacle, said microprocessor being pre-programmed to record the date and time of each change in status of said sensor detecting means.

13. A load management system according to claim 10, wherein said microprocessor is pre-programmed to record the date and time of each status changing operation of said manually operable means.

14. A load management system according to claim 1, wherein said control device comprises a first housing containing said switch means, load detecting sensor means, and line and load terminals for wired connection between said source of electric power and said appliance, means within said first housing interconnecting said line and load terminals with said switch means in circuit therebetween, plug receiving socket means wire-connected to the components within said first housing, and a second housing having plug-in connector means for insertion in said socket means, the remaining components of said control device being disposed with in said second housing for operative connection to the components in said first housing when said second housing is plugged into said socket means.

15. A load management system according to claim 14, wherein said load detecting sensor means comprises means for detecting the voltage across said load terminals and for detecting the current flowing between said line and load terminals whenever said switch means is closed.

16. A load management system according to claim 14, wherein said control device comprises manually operable means for switching said device from an OFF to an ON condition.

17. A load management system according to claim 16, wherein said microprocessor is pre-programmed to record the date and time of each status changing operation of said manually operable means.

18. A method of load management by an electric power utility of electric appliance demand comprising in combination the steps of furnishing a customer of said utility with a plug-in device for installation between a pre-selected appliance and an electric power source on premises of said customer which source is supplied with electricity by said utility; said device being provided with means for selectively controlling the ON-OFF periods of the appliance operation to which it is connected, means for sensing customer alteration of the utility intended operation of said device, and memory means for recording in said device its history of operation including each instance of customer alteration; instructing said device to interrupt power consumption by said appliance during selected times of anticipated peak power usage; periodically retrieving said device from said customer and reading the recorded contents of said memory to ascertain customer compliance with the utility schedule of power usage by said pre-selected appliance.

19. A method of load management according to claim 18, further comprising the step of transmitting from a utility-controlled remote location a signal to said device for initiating an OFF period of operation of said appliance.

20. A method of load management according to claim 19, wherein said device is provided with manual input means whereby a customer can override an OFF period of operation initiated by said utility.

21. A method of load management according to claim 20, wherein each instance of override by said customer is recorded in said memory means as to date, time and event.

22. A method of load management according to claim 21, wherein each instance of unplugging said appliance from said device is recorded in said memory means as to date, time and event.

23. A load management system comprising a control device having means for establishing its electrical connection in series with an electric powered appliance, between said appliance and a source of electric power therefor, said device including a microprocessor, switch means coupled to said microprocessor under its control for controlling circuit completion and interruption between said source of electric power and said appliance, clock means associated with said microprocessor for maintaining real time, memory means associated with said microprocessor for storing data furnished by said microprocessor, means for receiving electrical control signals from an external source for programming said microprocessor to perform controlling and data recording functions, and sensor means coupled to said microprocessor for sensing at least the power drawn by said appliance, at least said memory means being housed in a removable plug-in structure whereby at least said memory means can be removed for down-loading of any data stored therein.

24. A load management system according to claim 23, wherein said control device comprises plug-in connector means for connection to an electric power outlet to receive line power, a receptacle for receiving the power plug of said appliance, and means connecting said switch means in circuit between said connector means and said receptacle.

25. A method of load management by an electric power utility of electric appliance demand comprising in combination the steps of providing a device for installation between a pre-selected appliance and an electric power source on premises of a customer of the power utility which source is supplied with electricity by said utility; said device being provided with a microprocessor, means for sensing the power drawn by said appliance, and memory means for recording in said device its history of operation; and programming said microprocessor from a source external to said device to record receipt of a message, the power being drawn by the appliance, and to repeat the measurement of drawn power at a predetermined time interval over a predetermined period of time.

26. A method of load management according to claim 25, wherein a signal is supplied from said external source to alter said programming of said microprocessor.

* * * * *